United States Patent
Nakaya

(10) Patent No.: US 7,831,232 B2
(45) Date of Patent: Nov. 9, 2010

(54) MULTIPLE INPUT MULTIPLE OUTPUT COMMUNICATION APPARATUS

(75) Inventor: Yuuta Nakaya, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 783 days.

(21) Appl. No.: 11/471,326

(22) Filed: Jun. 20, 2006

(65) Prior Publication Data
US 2007/0207837 A1    Sep. 6, 2007

(30) Foreign Application Priority Data
Mar. 2, 2006   (JP) .............................. 2006-056971

(51) Int. Cl.
    *H04B 7/08* (2006.01)
(52) U.S. Cl. .................. 455/277.1; 455/562.1
(58) Field of Classification Search ............. 455/562.1, 455/103, 112, 41.3; 375/267; 370/335
    See application file for complete search history.

(56) References Cited

U.S. PATENT DOCUMENTS

| | | | |
|---|---|---|---|
| 6,377,631 B1 * | 4/2002 | Raleigh ..................... | 375/299 |
| 7,006,810 B1 * | 2/2006 | Winters et al. ............ | 455/277.1 |
| 7,328,033 B2 * | 2/2008 | Rappaport et al. .......... | 455/500 |
| 7,336,719 B2 * | 2/2008 | Gore et al. .................. | 375/267 |
| 2003/0162519 A1 | 8/2003 | Smith et al. | |
| 2005/0078650 A1 * | 4/2005 | Ghosh ...................... | 370/347 |
| 2005/0090205 A1 | 4/2005 | Catreux-Erceg et al. | |
| 2005/0136844 A1 * | 6/2005 | Giesberts et al. ......... | 455/67.13 |
| 2006/0148506 A1 * | 7/2006 | Hoo .......................... | 455/522 |

FOREIGN PATENT DOCUMENTS

| | | |
|---|---|---|
| JP | 10-154952 | 6/1998 |
| JP | 2000-115064 | 4/2000 |
| JP | 2003-283399 | 10/2003 |
| JP | 2004-289407 | 10/2004 |
| JP | 2004-312381 | 11/2004 |
| WO | 2005/034408 | 4/2005 |
| WO | 2005/048486 | 5/2005 |

OTHER PUBLICATIONS

Bolcskei, H. et. al. "Performance of Space-Time Codes in the Presence of Spatial Fading Correlation" Conference Record of the Thirty-Fourth Asilomar Conference on Signals, Systems and Computers, 2000, vol. 1, Oct. 29-Nov. 1, 2000 pp. 687-693 vol. 1.*
Partial European Search Report dated Jul. 24, 2007, from the corresponding European Application.

(Continued)

*Primary Examiner*—Matthew D Anderson
*Assistant Examiner*—Gennadiy Tsvey
(74) *Attorney, Agent, or Firm*—Katten Muchin Rosenman LLP

(57) ABSTRACT

Signal to interference plus noise ratio information, delay spread information, or condition number information of a channel matrix in a multiple input multiple output communication are taken into account in addition to spatial fading correlation information for selecting a combination of at least two antennas from a plurality of antennas, then, the multiple input multiple output communication is conducted by using the selected antennas.

6 Claims, 5 Drawing Sheets

OTHER PUBLICATIONS

Extended European Search Report dated Oct. 26, 2007, from the corresponding European Application.

Tetsushi Abe, et al. "A Hybrid MIMO System Using Spatial Correlation", IEEE vol. 3, Oct. 27, 2002, pp. 1346-1350.

Andreas F. Molisch, et al. "Capacity of MIMO Systems with Antenna Selection" IEEE Transactions on Wireless Communications, vol. 4, No. 4, Jul. 2005, pp. 1759-1772.

Manel Collados et al. "Antenna Selection for MIMO-OFDM WLAN Systems" International Journal of Wireless Information Networks, vol. 12, No. 4, Dec. 2005, pp. 205-213.

Dhananjay A. Gore et al. "MIMO Antenna Subset Selection with Space-Time Coding" IEEE Transactions on Signal Processing, vol. 50, No. 10, Oct. 2002, pp. 2580-2588.

Notice of Rejection Ground dated Jun. 29, 2010, from the corresponding Japanese Application.

* cited by examiner

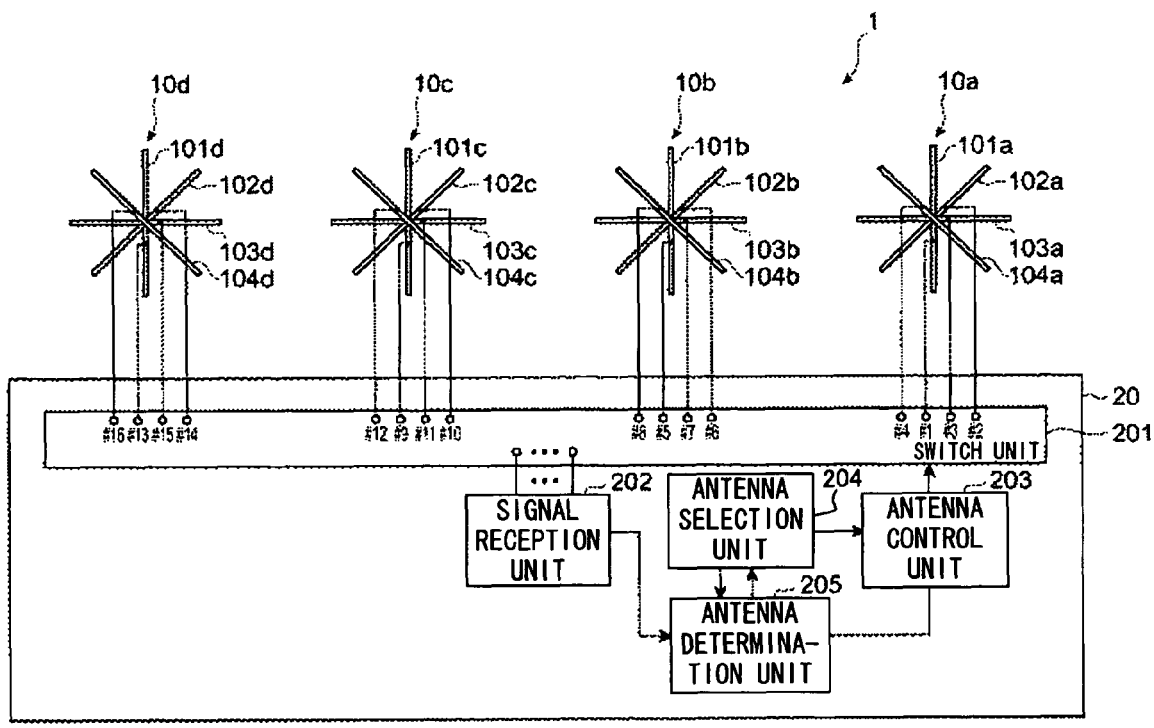
F I G. 1

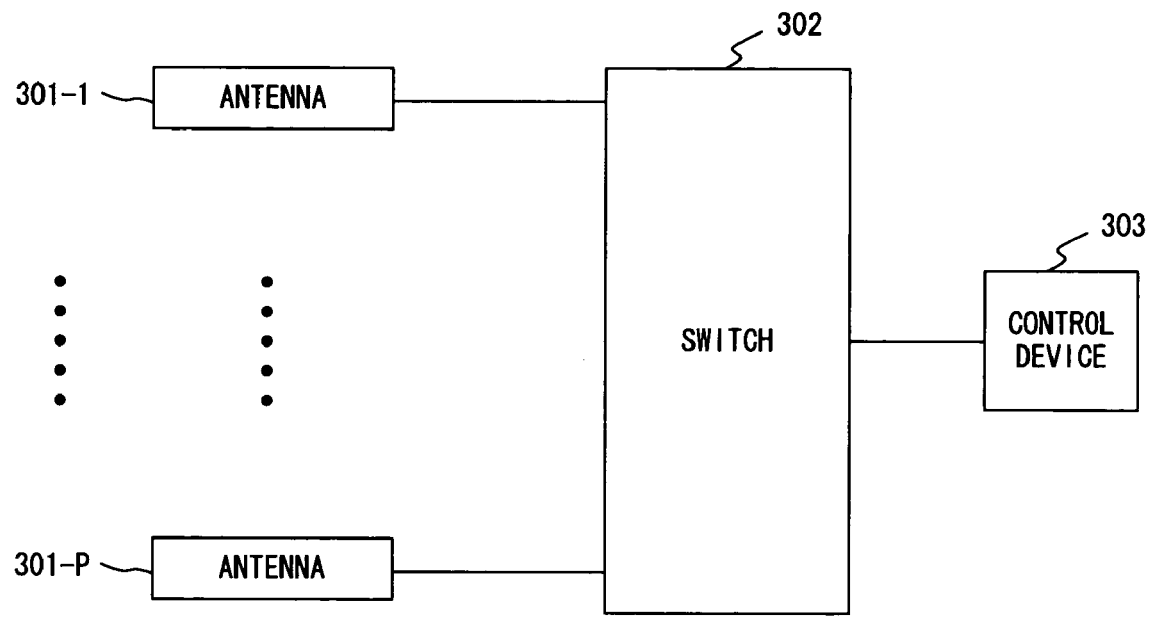
F I G. 2

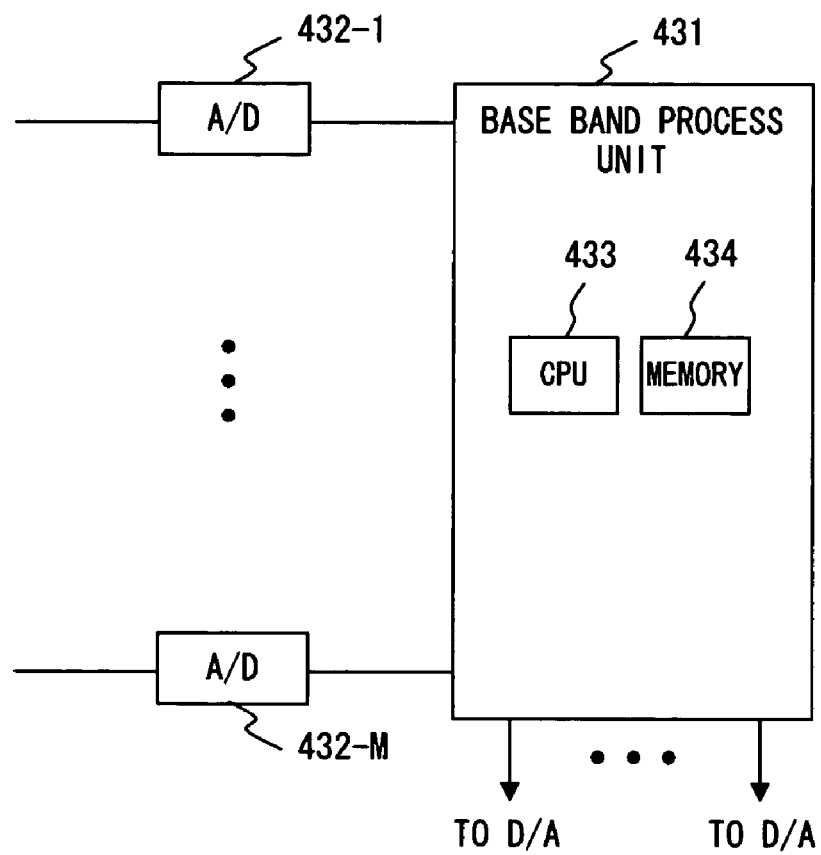
F I G. 4

MULTIPLE INPUT MULTIPLE OUTPUT COMMUNICATION APPARATUS

BACKGROUND OF THE INVENTION

1. Field of the Invention

The present invention relates to a wireless communication system, and particularly to a communication apparatus in a MIMO (Multiple Input Multiple Output) system, which conducts wireless communications using a plurality of antennas for transmitting and receiving.

2. Description of the Related Art

A received signal r in a wireless communication is given as a result of integrating the product of a directivity $G(\theta, \phi)$ of an antenna and a characteristic $H(\theta, \phi)$ of a propagation path, as shown in the equation below.

$$r = \int_0^\pi \int_{-\pi}^\pi G(\theta, \phi) H(\theta, \phi) d\phi d\theta \quad (1)$$

In the above equation, $\theta$ and $\phi$ respectively represent an azimuth angle and an elevation angle in the receiving side. Generally, because $H(\theta, \phi)$ is a variable of natural phenomenon which a human can not control, and expresses an incoming wave distribution which is spatially polarized. Accordingly, it is desired that human controllable $G(\theta, \phi)$ is spatially uniform (nondirectional antenna) for improving a received power, however, it is not practical to construct such an antenna.

As a result, a case occurs that a directivity of an antenna is null in the direction from which radio waves are coming. In this case, the received power is greatly reduced while received electric field density is high.

In recent years, as a technique of improving frequency utilization efficiency, a MIMO system has gathered interests in the field of a wireless communication, in which communications are conducted by a transmitting side and a receiving side both of which have a plurality of antennas respectively. In the transmitting side in the MIMO system, a spatial multiplexing is conducted by simultaneously transmitting different information from the plurality of transmission antennas at the same frequency. In the receiving side, signals are received by the plurality of reception antennas, and information is extracted by demultiplexing the respective signals.

Then, it is necessary that the respective antennas are arranged such that fading correlations between the antennas are sufficiently low in the receiving side because the spatially multiplexed signals are to be demultiplexed.

FIG. 1 shows a configuration of a radio wave transmission/reception apparatus disclosed in the Patent Document 1 below.

Patent Document 1
 Japanese Patent Application Publication No. 2004-312381

This radio wave transmission/reception apparatus 1 comprises four antenna element groups 10a through 10d, and a body 20. The antenna element group 10a comprises antenna elements 101a through 104a, the antenna element group 10b comprises antenna elements 101b through 104b, the antenna element group 10c comprises antenna elements 101c through 104c, and the antenna element group 10d comprises antenna elements 101d through 104d.

The body 20 comprises a switch unit 201, a signal reception unit 202, an antenna control unit 203, an antenna selection unit 204, and an antenna determination unit 205, and selects a combination from the antenna elements 101a through 104a, 101b through 104b, 101c through 104c, and 101d through 104d such that fading correlations between the antenna elements is the minimum.

However, the above conventional antenna selection method has the problems below.

In the MIMO system, there are some factors that determine characteristic, in addition to the fading correlations between antennas. Accordingly, it is not always the most suitable antenna selection method to select the combination of the antennas based only on a reference of the fading correlation.

SUMMARY OF THE INVENTION

It is an object of the present invention to select the most suitable combination of antennas while taking into account the factors other than fading correlations in a MIMO system.

The MIMO communication apparatus according to the present invention comprises a plurality of antennas for conducting wireless communications, a switch for switching the antennas, and a control device. The control device determines a combination of at least two antennas used for the MIMO communication from the antennas in accordance with a prescribed selection reference, and outputs a selection signal causing selection of the determined antennas to the switch.

In the first MIMO communication apparatus, the control device uses signal to interference plus noise ratio (SINR) information and spatial fading correlation information as the selection reference.

In the second MIMO communication apparatus, the control device uses SINR information and delay spread information as the selection reference.

In the third MIMO communication apparatus, the control device uses condition number information of propagation path matrix in the MIMO communication as the selection reference.

BRIEF DESCRIPTION OF THE DRAWINGS

FIG. 1 shows a conventional antenna selection method;

FIG. 2 shows a principle of a MIMO communication apparatus according to the present invention;

FIG. 4 shows a configuration of a MIMO receiver; and

DESCRIPTION OF THE PREFERRED EMBODIMENT

Figure 3:
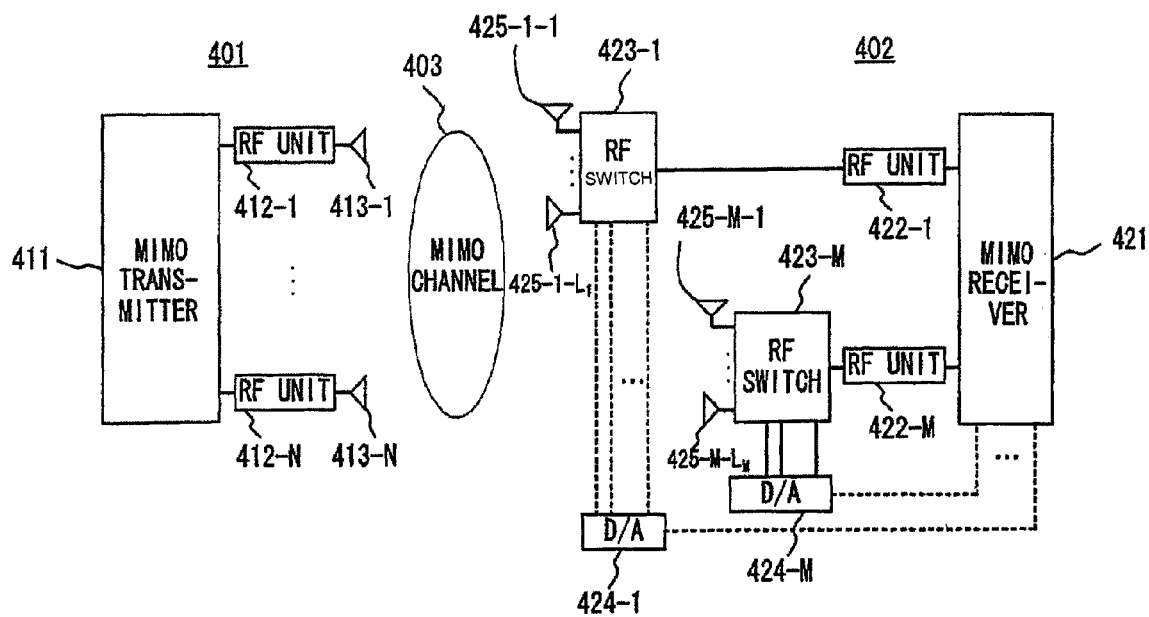
FIG. 3 shows a configuration of the MIMO communication apparatus.

Hereinbelow, the most preferred embodiment for implementing the present invention is explained in detail, by referring to the drawings.

FIG. 2 shows a principle of a MIMO communication apparatus according to the present invention. The MIMO communication apparatus of FIG. 2 comprises P number of antennas 301-1 through 301-P for conducting wireless communications, a switch 302 for switching the antennas 301-1 through 301-P, and a control device 303.

The control device 303 determines a combination of at least two antennas used for the MIMO communication from the antennas 301-1 through 301-P in accordance with a prescribed selection reference, and outputs a selection signal causing the selection of the determined antennas to the switch 302.

In the first principle, the control device 303 uses signal to interference plus noise ratio (SINR) information and spatial fading correlation information as the prescribed selection reference.

In the second principle, the control device 303 uses SINR information and delay spread information as the prescribed selection reference.

In the third principle, the control device 303 uses condition number information of propagation path matrix (channel matrix) in the MIMO communication as the prescribed selection reference.

The switch 302 selects the combination of the antennas used for the MIMO communication in accordance with the selection signal received from the control device 303.

The antennas 301-1 through 301-P correspond, for example, to antennas 425-$m$-1 through 425-$m$-L$_m$ of FIG. 3 which will be described later, and the switch 302 corresponds, for example, to an RF switch 423-$m$ ($m$=1, . . . , M). The control device 303 corresponds, for example, to a CPU (Central Processing Unit) 433 and a memory 434 of FIG. 4, which will be explained later.

According to the present invention, the combination of the antennas is selected by taking into account the SINR, the delay spread, or the condition number of channel matrix, in addition to the fading correlation, accordingly, better communication quality is attained compared to a method in which only the fading correlation is used as the selection reference. Therefore, the effect can be attained that an error rate is lowered in case of employing the same modulation method, and that a communication distance can be lengthened in case of evaluation by the same error rate.

According to the present embodiment, the combination of the selection references which is the most suitable for the environment is determined by employing the SINR, the delay spread, and the condition number of the channel matrix as the selection reference in addition to the fading correlation. Further, by selecting the antennas based on the combination, the characteristic of the MIMO system is improved.

FIG. 3 shows a configuration of the above MIMO communication system. In this system, a MIMO communication apparatus 401 and a MIMO communication apparatus 402 conduct wireless communications via a MIMO channel 403 on the propagation path. Hereinbelow, as one example, the case is explained in which the MIMO communication apparatus 401 transmits a signal to the MIMO communication apparatus 402.

The MIMO communication apparatus 401 of the transmitting side comprises a MIMO transmitter 411, and N number of branches, and the n-th branch (n=1, . . . , N) comprises a radio frequency (RF) unit 412-$n$ and an antenna 413-$n$.

The MIMO communication apparatus 402 of the receiving side comprises a MIMO receiver 421, and M number of branches, and the m-th branch (m=1, . . . , M) comprises an RF unit 422-$m$, an RF switch 423-$m$, a digital/analog (D/A) converter 424-$m$, and L$_m$ number of antennas 425-$m$-1 through 425-$m$-L$_m$. On each branch, the RF switch 423-$m$ selects one antenna from the antennas 425-$m$-1 through 425-$m$-L$_m$ in a carrier frequency (high frequency) band.

The RF unit 422-$m$ mainly comprises a filter, a mixer, and an amplifier, and converts a base band signal into a high frequency signal when transmitting, and converts the high frequency signal into the base band signal when receiving. The RF unit 422-$m$ can comprise elements other than the above elements.

As shown in FIG. 4, the MIMO receiver 421 comprises a base band process unit 431, and M number of analog/digital (A/D) converters 432-1 through 432-M, and the base band process unit 431 comprises the CPU (Central Processing Unit) 433 and the memory 434. The A/D converter 432-$m$ converts a signal received from the m-th branch into a digital signal, and the base band process unit 431 executes a base band process by using the digital signal.

When the antenna is selected, the CPU 433 calculates a prescribed evaluation function by using the memory 434, and outputs an antenna selection signal to the D/A converters 424-1 through 424-M based on the calculation result.

The D/A converters 424-1 through 424-M convert the antenna selection signal into an analog signal, and outputs the analog signal to the RF switches 423-1 through 423-M respectively. The RF switch 423-$m$ selects one antenna from the antennas 425-$m$-1 through 425-$m$-L$_m$ in accordance with the antenna selection signal, and connects the selected antenna to the RF unit 422-$m$.

When the RF switch 423-$m$ is controlled by means of digital signals, digital/digital converters are used in place of the D/A converters 424-1 through 424-M.

Now, methods are explained, for calculating the SINR, the fading correlation between the antennas, the delay spread, and the condition number of channel matrix used as the evaluation function.

First, it is assumed that the M number of received signals in the MIMO communication apparatus 402 are given from y(t) of the equation below.

$$y(t) = \int_{-\infty}^{\infty} H(\tau)s(t-\tau)d\tau + \sum_{v=1}^{V} \int_{-\infty}^{\infty} G_v(\tau)u_v(t-\tau)d\tau + n(t) \in C^{M \times 1} \quad (2)$$

In the above equation, t and $\tau$ respectively represent a time and a delay time. Also, when it is assumed that a propagation path response from the n-th antenna 413-$n$ in the MIMO communication apparatus 401 to the l$_m$-th antenna 425-$m$-l$_m$ in the m-th branch in the MIMO communication apparatus 402 is h$_{m,n}^{l_m}(\tau)$, the channel matrix H($\tau$) of the desired signal (transmitted signal), the desired signal s(t), and the noise n(t) are respectively defined by the equations (3), (4) and (5).

$$H(\tau) = \begin{bmatrix} h_{1,1}^{l_1}(\tau) & h_{1,2}^{l_1}(\tau) & \cdots & h_{1,N}^{l_1}(\tau) \\ h_{2,1}^{l_2}(\tau) & h_{2,2}^{l_2}(\tau) & \cdots & h_{2,N}^{l_2}(\tau) \\ \vdots & \vdots & \ddots & \vdots \\ h_{M,1}^{l_M}(\tau) & h_{M,2}^{l_M}(\tau) & \cdots & h_{M,N}^{l_M}(\tau) \end{bmatrix} \in C^{M \times N} \quad (3)$$

$$s(t) = \begin{bmatrix} s_1(t) \\ s_2(t) \\ \vdots \\ s_N(t) \end{bmatrix} \in C^{N \times 1} \quad (4)$$

$$n(t) = \begin{bmatrix} n_1(t) \\ n_2(t) \\ \vdots \\ n_M(t) \end{bmatrix} \in C^{M \times 1} \quad (5)$$

G$_v$($\tau$) and u$_v$(t) respectively represent the channel matrix and the transmitted signal of the v-th interfering station (v= 1, . . . , V), and V represents the maximum number of interfering stations.

(a) SINR

It is assumed that the result of estimation of H(τ) by using the known signal part of the received signals is Ĥ(τ). Further, the m-th row of the matrix of the estimation result is expressed by the equation below.

$$\hat{H}_m^{l_m}(\tau) = \left[ \hat{h}_{m,1}^{l_m}(\tau) \; \hat{h}_{m,2}^{l_m}(\tau) \; \ldots \; \hat{h}_{m,N}^{l_m}(\tau) \right] \quad (6)$$

In this case, the SINR in the antenna 425-$m$-$l_m$ is calculated by the equation below, using the equation (6).

$$SINR_m^{l_m} = \frac{E\left[\left| \int_{-\infty}^{\infty} \hat{H}_m^{l_m}(\tau) s_m(t-\tau) d\tau \right|^2 \right]}{E\left[\left| y(t) - \int_{-\infty}^{\infty} \hat{H}_m^{l_m}(\tau) s_m(t-\tau) d\tau \right|^2 \right]} \quad (7)$$

E[·] represents the expectation value operation. It is assumed that the estimation value is used as H(τ) in the calculation below.

(b) Fading Correlation

The fading correlation is obtained by conducting an averaging operation in which the spatial position is gradually shifted in the range that allows WSSUS (Wide-Sense Stationary Uncorrelated Scattering) in the case of the narrow-band communication. However, in the case of the wide-band communication, the fading correlation is the value close to the result of the averaging operation on the frequency axis. This is explained below.

When it is assumed that the Fourier transform pairs of the channel responses in the antenna 425-$m_1$-$l_{m1}$ and the antenna 425-$m_2$-$l_{m2}$ in the MIMO communication apparatus 402 are respectively $h_{m1,n}^{l_{m1}}(f)$ and $h_{m2,n}^{l_{m2}}(f)$, the fading correlation is given by the equation below.

$$C_{m_1,m_2} = \frac{\sum_{n=1}^{N} \int_{f_{min}}^{f_{max}} h_{m_1,n}^{l_{m_1}}(f) \left(h_{m_2,n}^{l_{m_2}}(f)\right)^* df}{\sqrt{\sum_{n=1}^{N} \int_{f_{min}}^{f_{max}} h_{m_1,n}^{l_{m_1}}(f) \left(h_{m_1,n}^{l_{m_1}}(f)\right)^* df} \sqrt{\sum_{n=1}^{N} \int_{f_{min}}^{f_{max}} h_{m_2,n}^{l_{m_2}}(f) \left(h_{m_2,n}^{l_{m_2}}(f)\right)^* df}} \quad (8)$$

In the above equation, * represents complex conjugate, and $f_{max}$ and $f_{min}$ respectively represent the maximum value and the minimum value of the target frequency.

(c) Delay Spread

The delay spread is standard deviation of a delay profile expressing spread of the power distribution with respect to the delay time. The delay spread in the antenna 425-$m$-$l_m$ of the MIMO communication apparatus 402 is given by the equation below.

$$\sigma_m^{l_m} = \sqrt{\frac{\sum_{n=1}^{N} \int_{-\infty}^{\infty} \left(\tau - \tau_{mean}^{l_m}\right)^2 h_{m,n}^{l_m}(\tau) d\tau}{P_{l_m}}} \quad (9)$$

$$\tau_{mean}^{l_m} = \frac{\sum_{n=1}^{N} \int_{-\infty}^{\infty} \tau h_{m,n}^{l_m}(\tau) d\tau}{P_{l_m}} \quad (10)$$

$$P_{l_m} = \sum_{n=1}^{N} \int_{-\infty}^{\infty} h_{m,n}^{l_m}(\tau) d\tau \quad (11)$$

(d) Condition Number

When it is assumed that the maximum value and the minimum value of the singular value of the matrix $H \in C^{M \times N}$ ($N \leq M$) are respectively defined as $\lambda_{max}$ and $\lambda_{min}$, the condition number is given by the equation below.

$$\kappa = \frac{\lambda_{max}}{\lambda_{min}} (\geq 1) \quad (12)$$

Next, specific examples of the evaluation function using the SINR, the fading correlation, the delay spread, and the condition number are explained. In these examples, the evaluation functions are expressed in the case that the antennas 425-1-$l_1$ through 425-M-$l_M$ are selected respectively in the 1st through the Mth branches.

(A) SINR and Fading Correlation

Basically in the MIMO communication system, the higher the SINR is, the better the characteristic is, and also, the lower the fading correlation is, the better the characteristic is. Accordingly, it is possible to improve the characteristic, for example, by selecting a combination of antennas such that the value of the evaluation function expressed by the formula below is large when the SINR and the fading correlation are used as the selection references.

$$\frac{\sum_{m=1}^{M} SINR_m^{l_m}}{\prod_{m_1 < m_2} C_{m_1,m_2}} \quad (13)$$

In the above formula, the multiplication symbol in the denominator represents the operation of multiplying fading correlation $C_{m1, m2}$ with respect to all the combinations ($m_1$, $m_2=1, \ldots, M$, $m_1<m_2$) in which the values of $m_1$ and $m_2$ are different.

(B) SINR and Delay Spread

Generally in the MIMO wireless communication system, a design is employed in which an encoding gain is obtained by using an error correction technique at the time of a frequency selective fading, accordingly, the greater the delay spread is, the better the characteristic is. In the case of OFDM (Orthogonal Frequency Division Multiplexing), delayed waves have to be within a guard interval. However, it is possible to attain the above effect by using an adaptive canceller.

When the SINR and the delay spread are used as the selection references, the combination of the antennas is to be selected such that the value of the evaluation function expressed by the formula below is large, for example.

$$\left(\sum_{m=1}^{M} SINR_{m}^{l_m}\right) \times \left(\sum_{m=1}^{M} \sigma_{m}^{l_m}\right) \quad (14)$$

(C) Fading Correlation and Delay Spread

When the fading correlation and the delay spread are used as the selection references, the combination of the antennas is to be selected such that the value of the evaluation function expressed by the formula below is large, for example.

$$\frac{\sum_{m=1}^{M} \sigma_{m}^{l_m}}{\prod_{m_1 < m_2} C_{m_1, m_2}} \quad (15)$$

(D) SINR, Fading Correlation, and Delay Spread

When the SINR, the fading correlation, and the delay spread are used as the selection references, the combination of the antennas is to be selected such that the value of the evaluation function expressed by the formula below is large, for example.

$$\frac{\left(\sum_{m=1}^{M} SINR_{m}^{l_m}\right) \times \left(\sum_{m=1}^{M} \sigma_{m}^{l_m}\right)}{\prod_{m_1 < m_2} C_{m_1, m_2}} \quad (16)$$

(E) Condition Number

Generally in the MIMO wireless communication system, the smaller the condition number of the channel matrix is, the better the characteristic is, because the influence of the noise n(t) on the desired signal s(t) is suppressed. Accordingly, for example, by using as the evaluation function the condition number $\kappa$ $(l_1, l_2, \ldots, l_M)$ obtained from the H($\tau$) estimated by selecting the antennas 425-1-$l_1$ through 425-M-$l_M$, the combination of the antennas is to be selected such that the value of the evaluation function is small.

Figure 5:
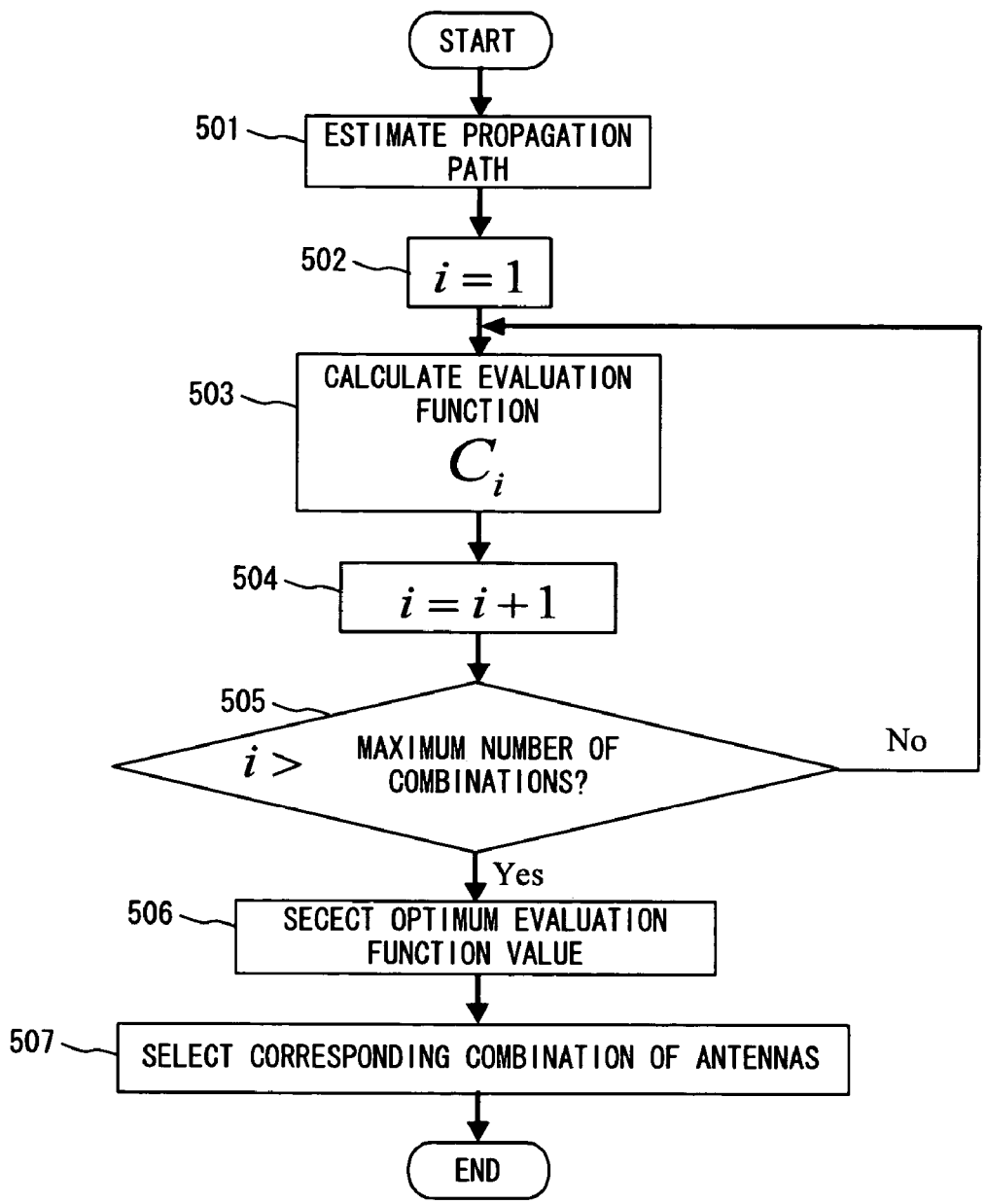
FIG. 5 is a flowchart of an antenna selection process.

FIG. 5 is a flowchart of an antenna selection process using such an evaluation function. The CPU 433 first estimates a propagation path by using known signals, and estimates the channel matrix H($\tau$) (step 501). Then, the channel matrix H($\tau$) is estimated for all the combinations of M number of antennas in M number of branches, respectively.

Next, a control variable i is set to 1 (step 502), and an evaluation function value $C_i$ is calculated by using a predetermined evaluation function for i-th combination of M number of antennas (step 503).

Next, 1 is added to i (step 504), and the addition result is compared with the maximum number of the combinations (step 505). In this case, the maximum number of combinations is given by $L_1 \times L_2 \times \ldots \times L_M$.

If i is not larger than the maximum number of the combinations, the processes of step 503 and subsequent steps are repeated, and if i is larger than the maximum number of the combinations, the optimum value is selected from the calculated evaluation function values (step 506). For example, when one of the evaluation functions of the formulas (13) through (16) is used, the maximum value among the evaluation function values is the optimum value, and when the condition number $\kappa$ $(l_1, l_2, \ldots, l_M)$ is used as the evaluation function, the minimum value among the evaluation function values is the optimum value.

Then, the antenna selection signal causing the selection of the combination of antennas corresponding to the evaluation function value is output to the D/A converters 424-1 through 424-M (step 507). Thereby, one antenna is selected from the $L_m$ number of antennas in the m-th branch (m=1, . . . , M), and the selected antenna is connected to the RF unit 422-$m$.

Additionally, the evaluation functions used for the antenna selection are not limited to the above functions of (A) through (E), and other evaluation functions can be employed, which use the SINR, the fading correlation, the delay spread, and the condition number.

What is claimed is:

1. A multiple input multiple output communication apparatus, comprising:

a plurality of antennas for conducting a wireless communication;

a switch for switching the plurality of antennas; and a control device for determining a combination of at least two antennas used for a multiple input multiple output communication from the plurality of antennas using signal to interference plus noise ratio information and spatial fading correlation information as a selection reference, and for outputting a selection signal for a selection of the at least two antennas to the switch, wherein:

the plurality of antennas are divided into M branches each including two or more antennas;

$SINR_m^{l_m}$ indicates a signal to interference plus noise ratio in an $l_m$-th antenna in an m-th branch of the M branches, $l_m$ varying from 1 to the number of antennas of the m-th branch $L_m$;

$C_{m_1, m_2}$ indicates a fading correlation between an $l_{m1}$-th antenna in an m1-th branch of the M branches and an $l_{m2}$-th antenna in an m2-th branch of the M branches, $l_{m1}$ and $l_{m2}$ varying from 1 to $L_{m1}$ and $L_{m2}$, respectively; and the control device uses an evaluation function $$\frac{\sum_{m=1}^{M} SINR_{m}^{l_m}}{\prod_{m_1 < m_2} C_{m_1, m_2}}$$

for determining the combination of the at least two antennas, $$\sum_{m=1}^{M} SINR_{m}^{l_m}$$

and $$\prod_{m_1 < m_2} C_{m_1, m_2}$$

varying depending on values of $l_1$ through $l_M$, and selects $l_1$-th through $l_M$-th antennas from first through M-th branches where the value of the evaluation function is the maximum with the at least two antennas.

2. The multiple input multiple output communication apparatus according to claim 1, wherein:

the control device determines the combination of the at least two antennas by adding delay spread information to the selection reference.

3. The multiple input multiple output communication apparatus according to claim 2, wherein:

the control device uses an evaluation function whose value becomes larger correspondingly as the signal to interference plus noise ratio becomes higher, becomes larger correspondingly as the spatial fading correlation becomes lower, and becomes larger correspondingly as the delay spread becomes larger, for determining the combination of the at least two antennas such that the value of the evaluation function is the maximum.

4. The multiple input multiple output communication apparatus according to claim 1, wherein:

the evaluation function includes components of a channel matrix in a multiple input multiple output communication; and the control device estimates the channel matrix for each of a plurality of combinations of the plurality of antennas by using a known signal, obtains an evaluation function value for each of the plurality of combinations by using the evaluation function, selects a maximum value among the obtained evaluation function values, and determines the combination of the at least two antennas corresponding to the selected evaluation function value.

5. A multiple input multiple output communication apparatus, comprising:

a plurality of antennas for conducting a wireless communication;

a switch for switching the plurality of antennas; and a control device for determining a combination of at least two antennas used for a multiple input multiple output communication from the plurality of antennas using signal to interference plus noise ratio information and delay spread information as a selection reference, and for outputting a selection signal for a selection of the at least two antennas to the switch, wherein:

the plurality of antennas are divided into M branches each including two or more antennas;

$SINR_m^{l_m}$ indicates a signal to interference plus noise ratio in an $l_m$-th antenna in an m-th branch of the M branches, $l_m$ varying from 1 to the number of antennas of the m-th branch $L_m$;

$\sigma_m^{l_m}$ indicates a delay spread in the $l_m$-th antenna in the m-th branch; and the control device uses an evaluation function $$\left(\sum_{m=1}^{M} SINR_m^{l_m}\right) \times \left(\sum_{m=1}^{M} \sigma_m^{l_m}\right)$$

for determining the combination of the at least two antennas and selects $l_1$-th through $l_M$-th antennas from first through M-th branches where the value of the evaluation function is the maximum with the at least two antennas.

6. The multiple input multiple output communication apparatus according to claim 5, wherein:

the evaluation function includes components of a channel matrix in a multiple input multiple output communication; and the control device estimates the channel matrix for each of a plurality of combinations of the plurality of antennas by using a known signal, obtains an evaluation function value for each of the plurality of combinations by using the evaluation function, selects a maximum value among the obtained evaluation function values, and determines the combination of the at least two antennas corresponding to the selected evaluation function value.

* * * * *